United States Patent [19]
Ueda

[11] Patent Number: 5,727,429
[45] Date of Patent: Mar. 17, 1998

[54] LOW PROFILE BICYCLE PEDAL AND CLEAT ASSEMBLY

[75] Inventor: Yutaka Ueda, Tondabayashi, Japan

[73] Assignee: Shimano, Inc., Osaka, Japan

[21] Appl. No.: 704,015

[22] Filed: Aug. 26, 1996

[51] Int. Cl.⁶ .................................................. G05G 1/14
[52] U.S. Cl. ........................ 74/594.6; 74/594.4; 36/131
[58] Field of Search ........................... 74/594.4, 594.6, 74/594.7; 36/131, 132

[56] References Cited

U.S. PATENT DOCUMENTS

| | | | |
|---|---|---|---|
| 4,523,492 | 6/1985 | Shimano | 74/594.4 |
| 4,646,586 | 3/1987 | Rapisarda | 74/594.6 |
| 4,686,867 | 8/1987 | Bernard et al. | 74/594.6 |
| 4,762,019 | 8/1988 | Beyl | 74/594.6 |
| 4,807,368 | 2/1989 | Beyl | 33/3 B |
| 4,827,797 | 5/1989 | Le Faou et al. | 74/594.6 |
| 4,838,115 | 6/1989 | Nagano | 74/594.4 |
| 4,840,085 | 6/1989 | Nagano | 74/594.4 |
| 4,882,946 | 11/1989 | Beyl | 74/594.6 |
| 4,928,549 | 5/1990 | Nagano | 74/594.6 |
| 5,003,841 | 4/1991 | Nagano | 74/594.4 |
| 5,060,537 | 10/1991 | Nagano | 74/594.6 |
| 5,115,692 | 5/1992 | Nagano | 74/594.4 |
| 5,131,291 | 7/1992 | Beyl | 74/594.6 |
| 5,195,397 | 3/1993 | Nagano | 74/594.4 |
| 5,282,325 | 2/1994 | Beyl | 36/27 |
| 5,379,665 | 1/1995 | Nagano | 74/594.4 |
| 5,417,128 | 5/1995 | Beyl | 74/594.6 |
| 5,419,218 | 5/1995 | Romano | 74/594.6 |
| 5,423,233 | 6/1995 | Peyre et al. | 74/594.6 |
| 5,497,680 | 3/1996 | Nagano | 74/594.6 |
| 5,505,111 | 4/1996 | Nagano | 74/594.6 |
| 5,522,282 | 6/1996 | Nagano | 74/594.6 |

FOREIGN PATENT DOCUMENTS

| | | | |
|---|---|---|---|
| 2442175 | 6/1980 | France. | |
| 3153426 | 6/1983 | Germany. | |
| 3831040 | 3/1989 | Germany | 74/594.6 |
| 03157285 | 7/1991 | Japan. | |
| 05111402 | 5/1993 | Japan. | |

Primary Examiner—Charles A. Marmor
Assistant Examiner—Saul J. Rodriguez
Attorney, Agent, or Firm—Roylance, Abrams, Berdo & Goodman, L.L.P.

[57] ABSTRACT

A low profile bicycle pedal having a pedal body supported by a pedal shaft to be rotatably about an axis of the pedal shaft and at a least pair of clamping members attached to the pedal body for releasably coupling a cleat of a cyclist's shoe thereto. Preferably, at least one of the clamping members is pivotally coupled to the pedal body. The cleat has a substantially C-shape with a pair of attachment portions for coupling the cleat to the cyclist's shoe, and connecting portion for interconnecting the attachment portions together. The attachment portions and the connecting portions form a pedal shaft receiving notch for accommodating the pedal shaft when coupled to the pedal body. In the first embodiment, the pedal body is provided with a friction adjusting mechanism for selectively increasing and/or decreasing friction between the cleat and the pedal body. In the second embodiment, a pair of substantially identical clamping members are pivotally coupled to the pedal body, with each clamping member having front and rear cleat engaging surfaces.

18 Claims, 11 Drawing Sheets

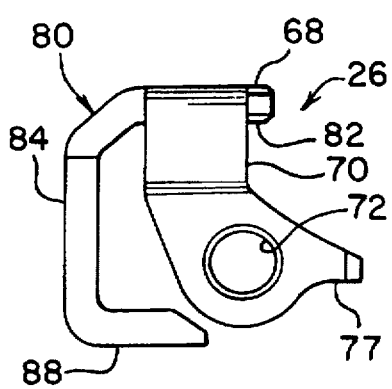
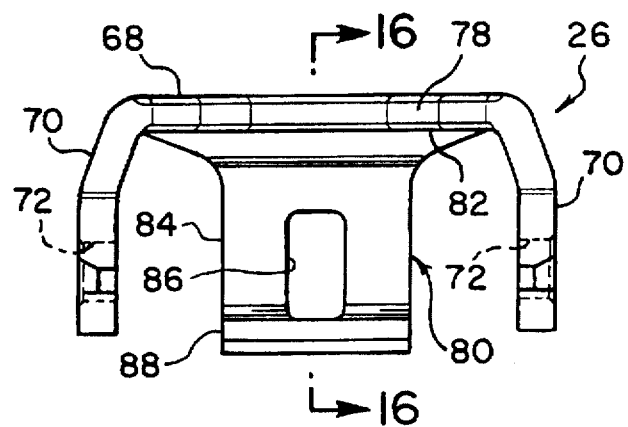
FIG. 12  FIG. 13
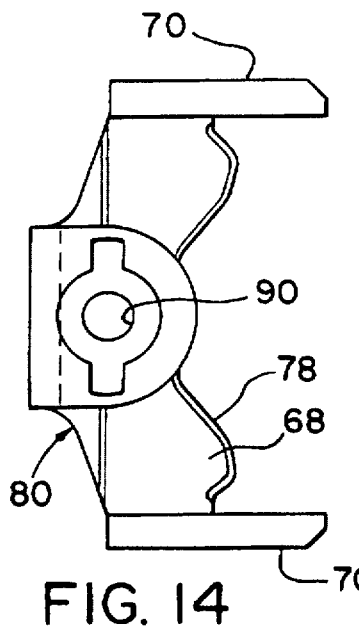
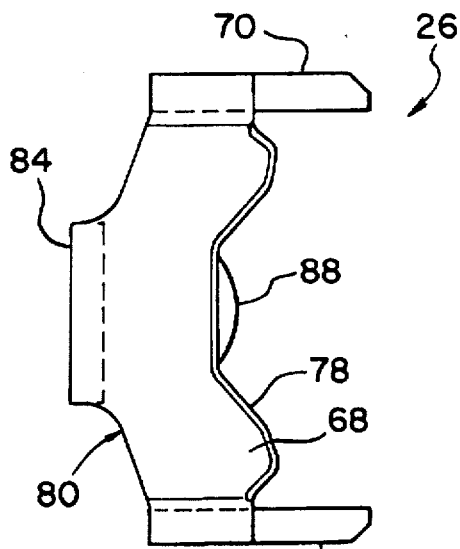
FIG. 14  FIG. 15
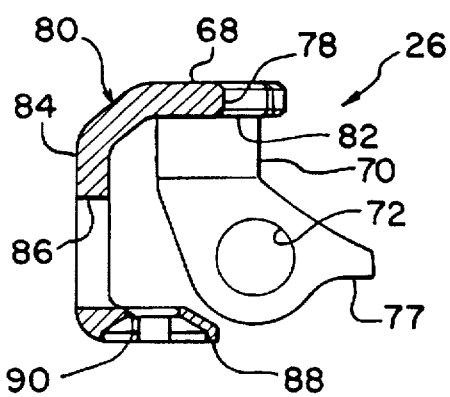
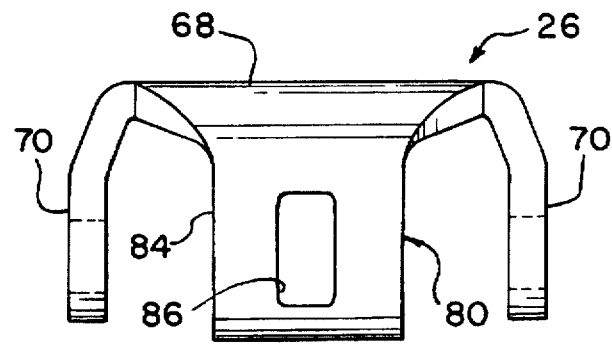
FIG. 16  FIG. 17

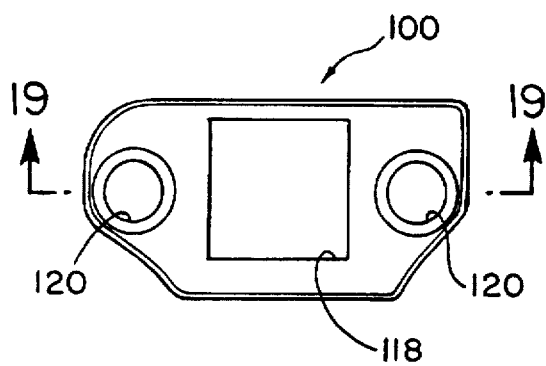
FIG. 18
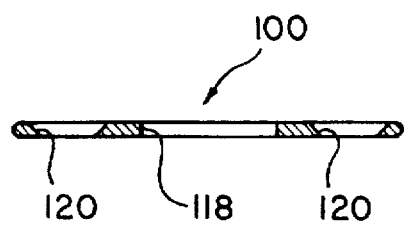
FIG. 19
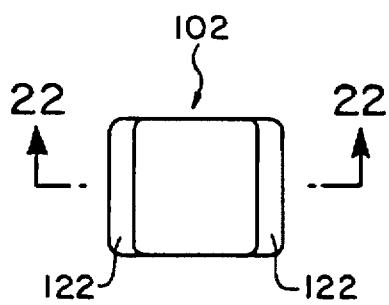
FIG. 20
FIG. 21
FIG. 22
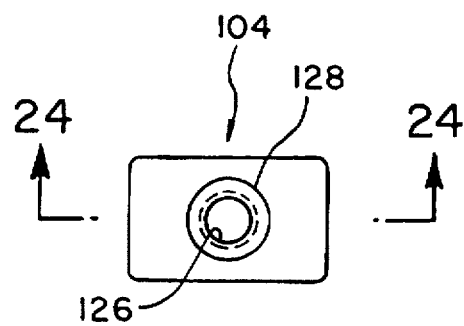
FIG. 23
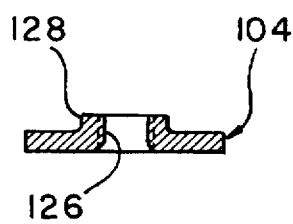
FIG. 24

LOW PROFILE BICYCLE PEDAL AND CLEAT ASSEMBLY

FIELD OF THE INVENTION

The present invention relates to a pedal for a bicycle which is releasably coupled to a cleat fixed to the sole of a shoe worn by a cyclist. More specifically, the present invention relates to a low profile bicycle pedal and cleat assembly wherein the cleat is coupled close to the longitudinal axis of rotation of the bicycle pedal about the pedal shaft.

BACKGROUND OF THE INVENTION

In recent years, bicycle pedals have been designed for specific purposes such as for pleasure, off road biking, road racing, etc. One particular type of bicycle pedal which is gaining more popularity, is the step-in or clipless pedal which releasably engages a cleat secured to the sole of a cyclist's shoe. In this type of bicycle pedal, the rider steps onto the pedal and a clamping mechanism automatically grips on to the cleat secured to the bottom of the cyclist's shoe. A tension mechanism is usually provided in the pedal for adjusting the force required to release the shoe cleat from the step-in pedal.

More specifically, when attaching the cyclist's shoe to the step-in pedal through the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

Many of the step-in pedals are provided with adjustment mechanisms for adjusting the release force of the hook or clamping members. While these adjustment mechanisms perform quite well, they are often difficult to adjust and/or increase the weight and size of the pedal.

When step-in pedals are used for road type bikes, the pedal is typically only provided with a single clamping assembly such that the cyclist's shoe can only be coupled to one of the two sides of the pedal. Off road or mountain type bikes, on the other hand, usually have a pair of clamping assemblies such that the cyclist's shoe can be clamped to either side of the pedal. In either case, it is desirable to design the pedal to be as compact and light weight as possible. Moreover, it is desirable to have the cyclist's foot as close as possible to the center longitudinal axis of the pedal shaft. Moreover, it is desirable to have the pedal as thin and small as possible to cut down on wind resistance and to increase the mount of robber on the sole of the cyclist's shoe.

In view of the above, it is apparent that there exists a need for a step-in bicycle pedal which has a low profile to reduce wind resistance, to add ground clearance between the pedal and the ground, and to maximize the amount of rubber on the sole of the cyclist's shoe. Moreover, there exists a need for a step-in bicycle pedal which provides easy adjustment of the release force of the cleat from the pedal.

This invention addresses these needs in the art, along with other needs which will become apparent to those skilled in the art once given this disclosure.

SUMMARY OF THE INVENTION

One object of the present invention is to provide a low profile bicycle pedal and cleat assembly which is relatively compact.

Another object of the present invention is to provide a step-in bicycle pedal which minimizes the distance between the cyclist's foot and the center longitudinal axis of the pedal shaft.

Yet another object of the present invention is to provide a bicycle pedal which maximizes the distance from the bottom of the pedal to the ground.

Still another object of the present invention is to provide a C-shaped cleat which is releasably coupled to a step-in pedal to minimize the distance between the cyclist's foot and the center longitudinal axis of the pedal shaft.

Yet another object of the present invention is to provide a bicycle pedal with a pair of substantially identical clamping members with both front and rear cleat engaging surfaces such that the cleat can be releasably coupled to either side of the pedal.

Yet another object of the present invention is to provide a pedal with a small footprint to maximize the amount of rubber on the sole of the cyclist's shoe.

These objects and advantages of the present invention can basically be obtained by providing a pedal shaft having a first end for attachment to a bicycle crank, a second end for supporting a cyclist's foot, and a center longitudinal axis of rotation; a pedal body rotatably coupled to the pedal shaft with a portion of the pedal body and the pedal shaft defining an effective outer diameter of rotation therebetween, the pedal body having a first end, a second end, a first side with a first cleat supporting surface facing in a first direction and a second side facing in a second direction, the first cleat supporting surface having a cleat receiving recess located adjacent the second end of the pedal shaft and lying within the effective outer diameter rotation between the portion of the pedal body and the pedal shaft; a first clamping member coupled to the first end of the pedal body, and having a front cleat engaging portion with a first cleat engaging surface facing in a direction substantially opposed to the first direction of the first cleat supporting surface; and a second clamping member coupled to the second end of the pedal body, and having a rear cleat engaging portion with a second cleat engaging surface facing in a direction substantially opposed to the first direction of the first cleat supporting surface.

The foregoing objects and advantages can also be attained by providing a bicycle shoe cleat, comprising: from attachment portion adapted to be coupled to the shoe via a first fastener, the front attachment portion having a front coupling surface lying in a first plane and adapted to engage a first clamping member of the bicycle pedal; a rear attachment portion adapted to be coupled to the shoe via a second fastener, the rear attachment portion having a rear coupling surface lying in a second plane and adapted to engage a second clamping member of the bicycle pedal; and a connecting portion interconnecting the front and rear attachment portions together, the connecting portion being offset from a center vertical plane of the shoe cleat for forming a pedal shaft receiving notch between the front and rear attachment portions.

Other objects, advantages and salient features of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the drawings which form a part of this original disclosure:

FIG. 12 is a side elevational view of the rear clamping member for the low profile bicycle pedal illustrated in FIGS. 1-8;

FIG. 13 is a right end elevational view of the rear clamping member illustrated in FIG. 12 for the low profile bicycle pedal illustrated in FIGS. 1-8;

FIG. 14 is a bottom plan view of the rear clamping member illustrated in FIGS. 12 and 13 for the low profile bicycle pedal illustrated in FIGS. 1-8;

FIG. 15 is a top plan view of the rear clamping member illustrated in FIGS. 12-14 for the low profile bicycle pedal illustrated in FIGS. 1-8;

FIG. 16 is a cross-sectional view of the rear clamping member illustrated in FIGS. 12-15 for the low profile bicycle pedal illustrated in FIGS. 1-8 as taken along section line 16—16 of FIG. 13;

FIG. 17 is a left end elevational view of the rear clamping member illustrated in FIGS. 12-16 for the low profile bicycle pedal illustrated in FIGS. 1-8;

FIG. 18 is a top plan view of the cover for the gap adjusting mechanism illustrated in FIGS. 4, 5, 7 and 8 for use with the low profile bicycle pedal illustrated in FIGS. 1-8;

FIG. 19 is a longitudinal cross-sectional view of the cover taken along section line 19—19 of FIG. 18 for the low profile bicycle pedal illustrated in FIGS. 1-8;

FIG. 20 is a top plan view of the pad for the gap adjusting mechanism illustrated in FIGS. 4, 5, 7 and 8 for the low profile bicycle pedal illustrated in FIGS. 1-8;

FIG. 21 is a bottom plan view of the pad illustrated in FIG. 20 for the friction gap adjusting mechanism illustrated in FIGS. 4, 5, 7 and 8 for the low profile bicycle pedal illustrated in FIGS. 1-8;

FIG. 22 is a cross-sectional view of the pad illustrated in FIGS. 20 and 21 taken along section line 22—22 of FIG. 20;

FIG. 23 is a top plan view of the bottom plate for the gap adjusting mechanism illustrated in FIGS. 4, 5, 7 and 8 for the low profile bicycle pedal illustrated in FIGS. 1-8;

FIG. 24 is a cross-sectional view of the bottom plate taken along section line 24—24 of FIG. 23;

DETAILED DESCRIPTION OF THE PREFERRED EMBODIMENTS

Figure 1:
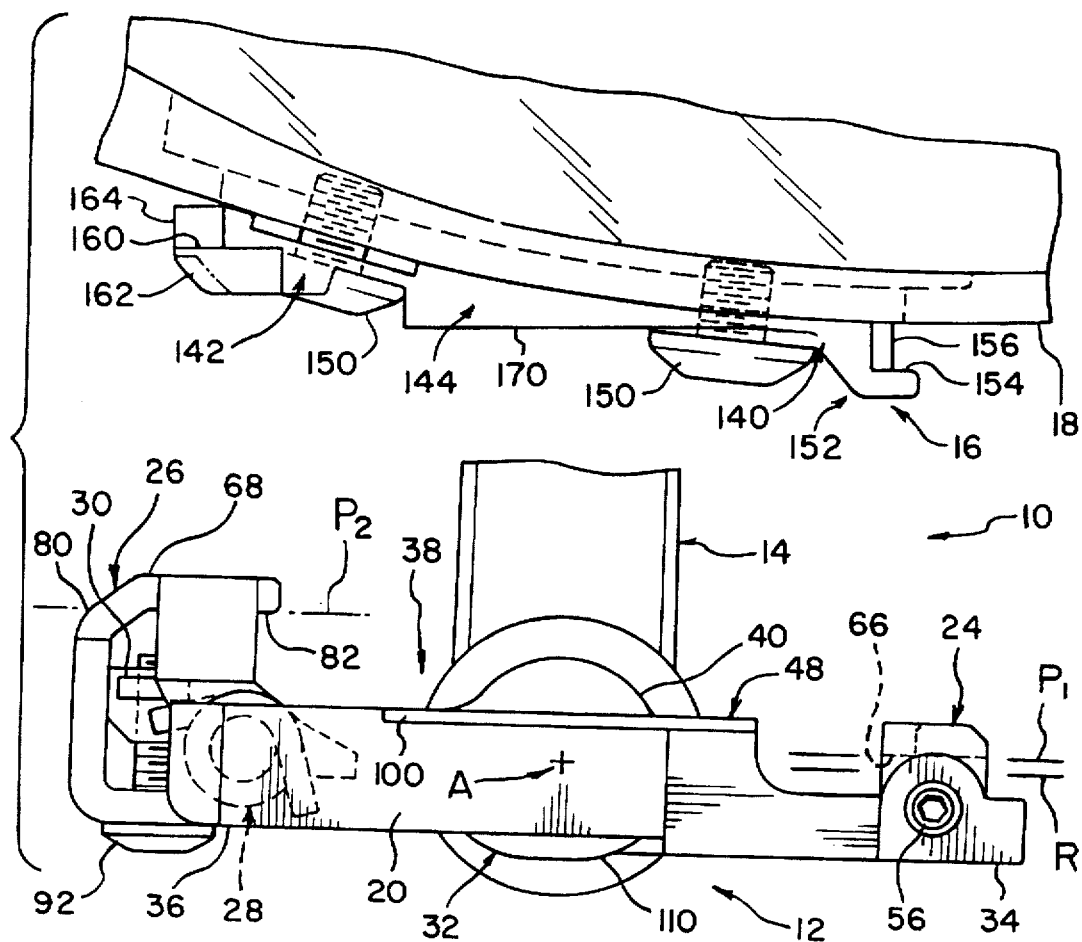
FIG. 1 is a partially, exploded outside elevational view of a low profile bicycle pedal and cleat assembly in accordance with the present invention, which is especially useful with road type bikes.

Referring initially to FIGS. 1–7, a low profile bicycle pedal and cleat assembly 10 in accordance with a first embodiment is illustrated. Low profile bicycle pedal and cleat assembly 10 basically includes a bicycle pedal 12 fixedly coupled to a bicycle crank arm 14 of a bicycle for rotation therewith, and a cleat 16 fixedly coupled to the bottom of sole 18 of a shoe. The bicycle pedal 12 illustrated in the drawings is a right side pedal. Of course, the same pedal is provided on the left side of the bicycle with the left side pedal being the mirror image of the right side pedal 12. Thus, the description will be made herein with reference to only one of the pedals.

Cleat 16 is designed to releasably couple sole 18 of the shoe to bicycle pedal 12. This type of pedal is often called a step-in pedal. Specifically, cleat 16 is engaged with pedal 12 by pressing cleat 16 into pedal 12 with a forward and downward motion. This releasably locks cleat 16 to pedal 12. Cleat 16 can be released from pedal 12 by twisting the heel of the shoe to the outside of pedal 12 as discussed below in more detail.

Bicycle pedal 12 includes a pedal body 20 for supporting a cyclist's foot, a pedal shaft 22 rotatably coupled to pedal body 20, a front or first clamping member 24 fixedly coupled to pedal body 20, a rear or second clamping member 26 pivotally coupled to pedal body 20, a biasing member 28 coupled between pedal body 20 and rear clamping member 26, a tension adjusting mechanism 30 coupled to rear damping member 26, and a gap adjusting mechanism 32 coupled to pedal body 20. Bicycle pedal 12 is especially designed for use with road bikes as opposed to use with mountain bikes. In particular, only one side of bicycle pedal 12 can be attached to cleat 16 as discussed below.

Figure 3:
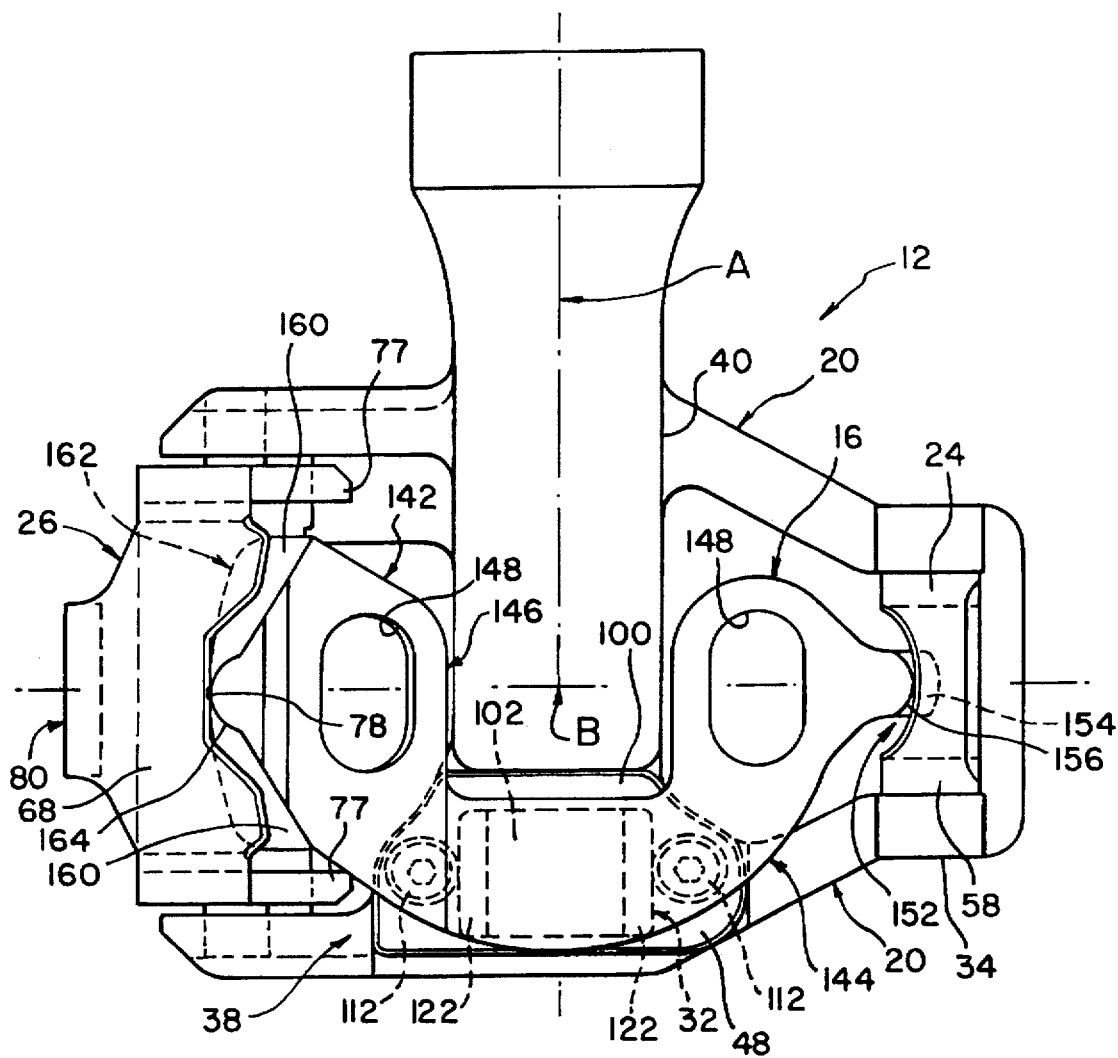
FIG. 3 is a top plan view of the low profile bicycle pedal and cleat assembly illustrated in FIG. 2, with the shoe removed from the cleat for purposes of illustration.
Figure 5:
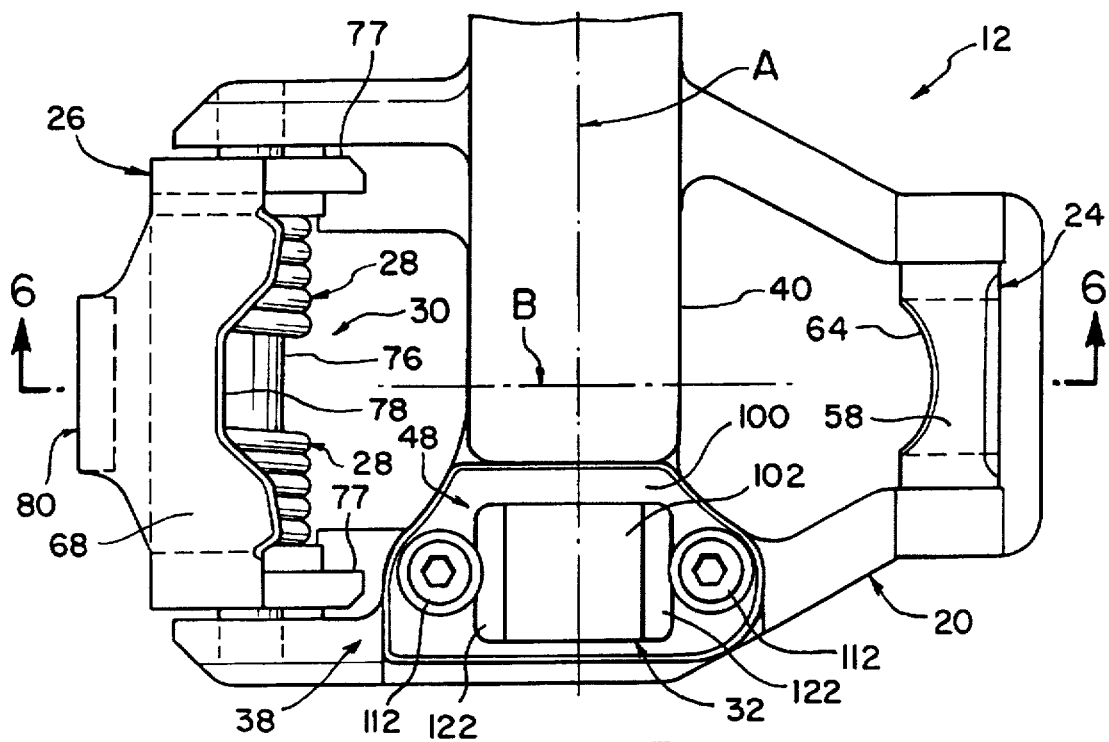
FIG. 5 is a partial top plan view of the bicycle pedal illustrated in FIGS. 1-4 without the cleat.
Figure 6:
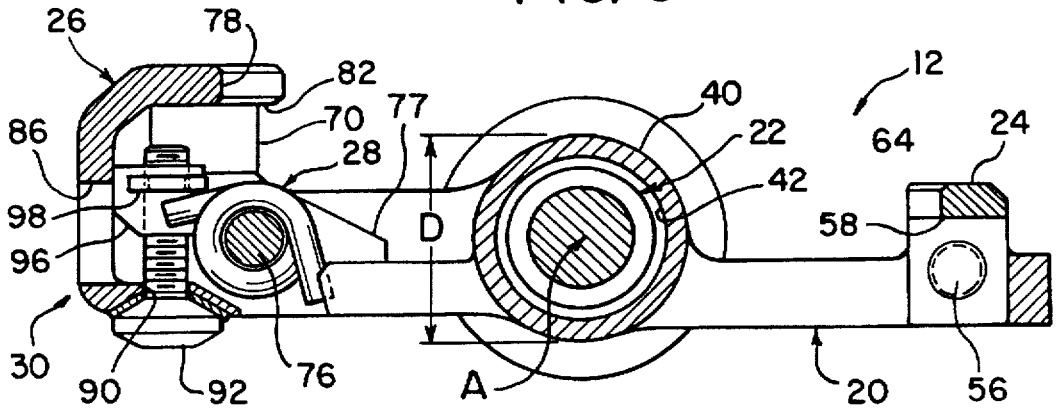
FIG. 6 is a longitudinal cross-sectional view of the bicycle pedal illustrated in FIGS. 1-5 taken along section line 6—6 of FIG. 5.
Figure 7:
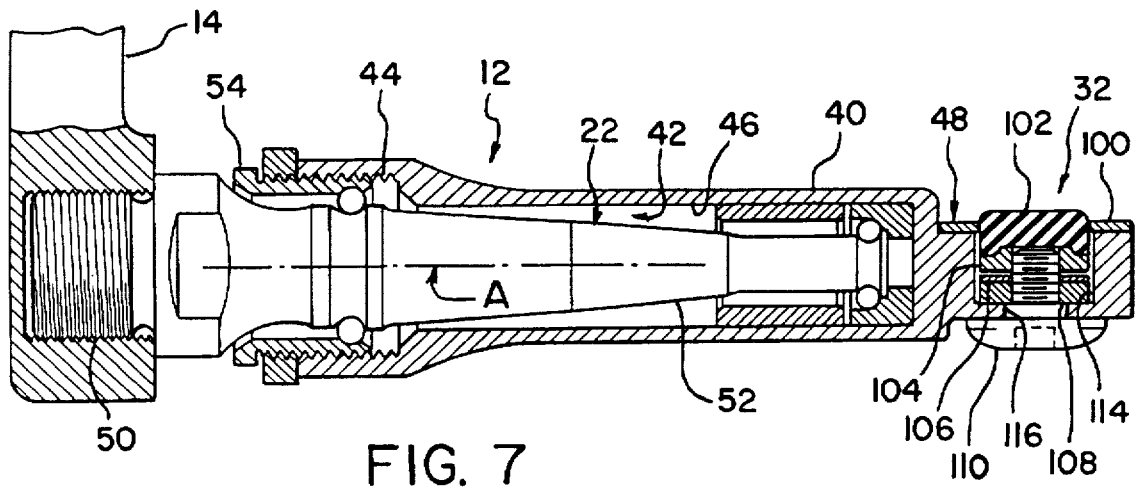
FIG. 7 is a transverse cross-sectional view of the low profile bicycle pedal illustrated in FIGS. 1-6 taken along the longitudinal axis of the pedal shaft, with the pedal shaft being illustrated in elevation.

As best seen in FIGS. 6 and 7, pedal body 20 is rotatably coupled to pedal shaft 22 for rotation about a center longitudinal axis A of pedal shaft 22. Pedal body 20 has a front or first end 34 with front clamping member 24 fixedly coupled thereto, and a rear or second end 36 with rear clamping member 26 pivotally coupled thereto. Pedal body 20 has a center longitudinal axis B extending between front end 34 and rear end 36 as seen in FIGS. 3 and 5. Center longitudinal axis B of pedal body 20 extends substantially perpendicular to center longitudinal axis A of pedal shaft 22. A reference plane R is defined by a flat horizontal plane passing through both center longitudinal axis A and B. Reference plane R will be used throughout the description of this invention and in the claims to define the structural relationships of various parts.

A cleat receiving area 38 is formed on the top side of pedal body 20 for receiving and supporting cleat 16 thereon. More specifically, cleat receiving area 38 is defined between front and rear clamping members 24 and 26.

As seen in FIGS. 6 and 7, pedal body 20 further includes a sleeve 40 with a substantially cylindrical bore 40 for rotatably receiving pedal shaft 22 therein. Bore 42 has a first threaded portion 44 and a second portion 46 with a smaller diameter than first portion 44. As seen in FIG. 6, sleeve 40 together with pedal shaft 22 define an effective outer diameter of rotation D between pedal body 20 and pedal shaft 22. The effective outer diameter of rotation D for the purposes of this claimed invention refers to the axial structure of pedal body 20 and pedal shaft 22 necessary for rotation between pedal body 20 and pedal shaft 22. In other words, the effective outer diameter of rotation D should not be limited to the preferred embodiment illustrated in the drawings.

Cleat receiving area 38 has a cleat supporting surface 48 located between clamping members 24 and 26 with at least a portion of cleat supporting surface 48 being positioned at the end of sleeve 40 and substantially along a vertical plane passing through central longitudinal axis A. Cleat supporting surface 48 lies within the outer effective diameter of rotation D. Since cleat supporting surface 48 lies within the outer effective diameter of rotation D of sleeve 40 of pedal body 20 and pedal shaft 22, cleat 16 can be positioned very close to the center longitudinal axis A of pedal shaft 22. This arrangement is desirable since the force of the cyclist's foot is moved close to the center longitudinal axis A of pedal shaft 22.

As best seen in FIG. 7, pedal shaft 22 has a first end 50 threadedly coupled to bicycle crank arm 14 for rotation therewith and a second end 52 rotatably coupled within bore 42 of sleeve 40 of pedal body 20. Pedal shaft 22 is secured to pedal body 20 by a lock bushing 54 which screws into threaded portion 44 of bore 42. The rotational structure of the connection between pedal shaft 22 and pedal body 20 is similar to that disclosed in U.S. Pat. No. 4,838,115 to Nagano. Accordingly, the disclosure of U.S. Pat. No. 4,838,115 relating to the rotational coupling of the pedal shaft to a pedal body is hereby incorporated herein by reference. Of course, it will be obvious to those skilled in the art that certain modifications and differences exist between the pedal shaft 22 illustrated in the present disclosure relative to the Nagano patent.

As seen in FIGS. 8–11, front damping member 24 is a substantially U-shaped member which is rigidly coupled to front end 34 of pedal body 20 via a pair of threaded pins 56 (only one shown). Threaded pins 56 are threadedly coupled to pedal body 20 in a substantially conventional manner, and thus, will not be discussed in further detail. Front clamping member 24 is preferably an integral member constructed of a one-piece unitary member from a suitable material such as a rigid metallic material. Front clamping member 24 has a front cleat engaging portion 58 and a pair of downwardly extending legs 60 with threaded holes 62 therein for receiving one of the threaded pins 56 therethrough to non-rotatably secure front clamping member 24 to pedal body 20.

Front cleat engaging portion 58 has a curved cutout portion 64 for engaging a portion of cleat 16 as discussed below. Front cleat engaging portion 58 also has a front cleat engaging surface 66 which faces downwardly towards the top side of pedal body 20. From cleat engaging surface 66 preferably lies in a plane $P_1$ which lies substantially parallel to reference plane R. Preferably, plane $P_1$ is spaced slightly above reference plane R. Of course, it will be apparent to those skilled in the art that plane $P_1$ can be moved closer or farther from reference plane R as needed and/or desired.

Referring now to FIGS. 12–17, rear clamping member 26 includes a rear cleat engaging portion 68 and a pair of legs 70 extending downwardly from rear cleat engaging portion 68 for coupling rear clamping member 26 to pedal body 20. More specifically, each of the legs 70 of rear clamping member 26 has a mounting hole 72 formed therein for receiving a bushing 74 which in turn are rotatably mounted on pivot pin 76. Accordingly, rear clamping member 26 is pivotally mounted about pivot pin 76 for movement between a cleat clamping position and a cleat releasing position. Each of the legs 70 also has a stop portion 77 which engages pedal body 20 to limit rotational movement of rear clamping member 26 via biasing member 28.

Rear cleat engaging portion 68 has a contoured cutout portion 78 along its front surface which faces front clamping member 24. Rear cleat engaging portion 68 also includes a center mounting flange 80 extending rearwardly and downwardly from its rearward edge for mounting tension adjusting mechanism 30 thereto.

A rear cleat engaging surface 82 is formed on the bottom surface of rear cleat engaging portion 68 for engaging and retaining cleat 16 to pedal body 20 as discussed below. Rear cleat engaging surface 82 is preferably a substantially flat surface which lies in a plane $P_2$ which is substantially parallel to reference plane R as well as plane $P_1$ of front cleat engaging portion 58. Preferably, plane $P_2$ is spaced farther than plane $P_1$ from reference plane R. Of course, it will be apparent to those skilled in the art that it is possible to have planes $P_1$ and $P_2$ coincide with each other if needed or desired.

Mounting flange 80 has a vertical portion 84 with a slot 86 and a substantially horizontal portion 88 with a hole 90. Slot 86 is designed for viewing the position of tension adjusting mechanism 30 which is coupled within hole 90 of mounting flange 80 for movement therewith, as explained below.

Biasing member 28 preferably includes a pair of torsion springs which are mounted on pivot pin 76 with one end of each spring engaging a part of pedal body 20 and the other end of each spring engaging a part of tension adjusting mechanism 30 as mentioned below. Biasing member 28 normally urges rear clamping member 26 to rotate about pivot pin 76 from a cleat releasing position to a cleat clamping position. In other words, biasing member 28 normally maintains rear clamping member 26 in a cleat engaging position such that plane $P_2$ of rear cleat engaging surface 82 is substantially parallel to reference plane R. The retaining force of biasing member 28 on rear clamping member 26 is controlled by tension adjusting mechanism 30.

Figure 8:
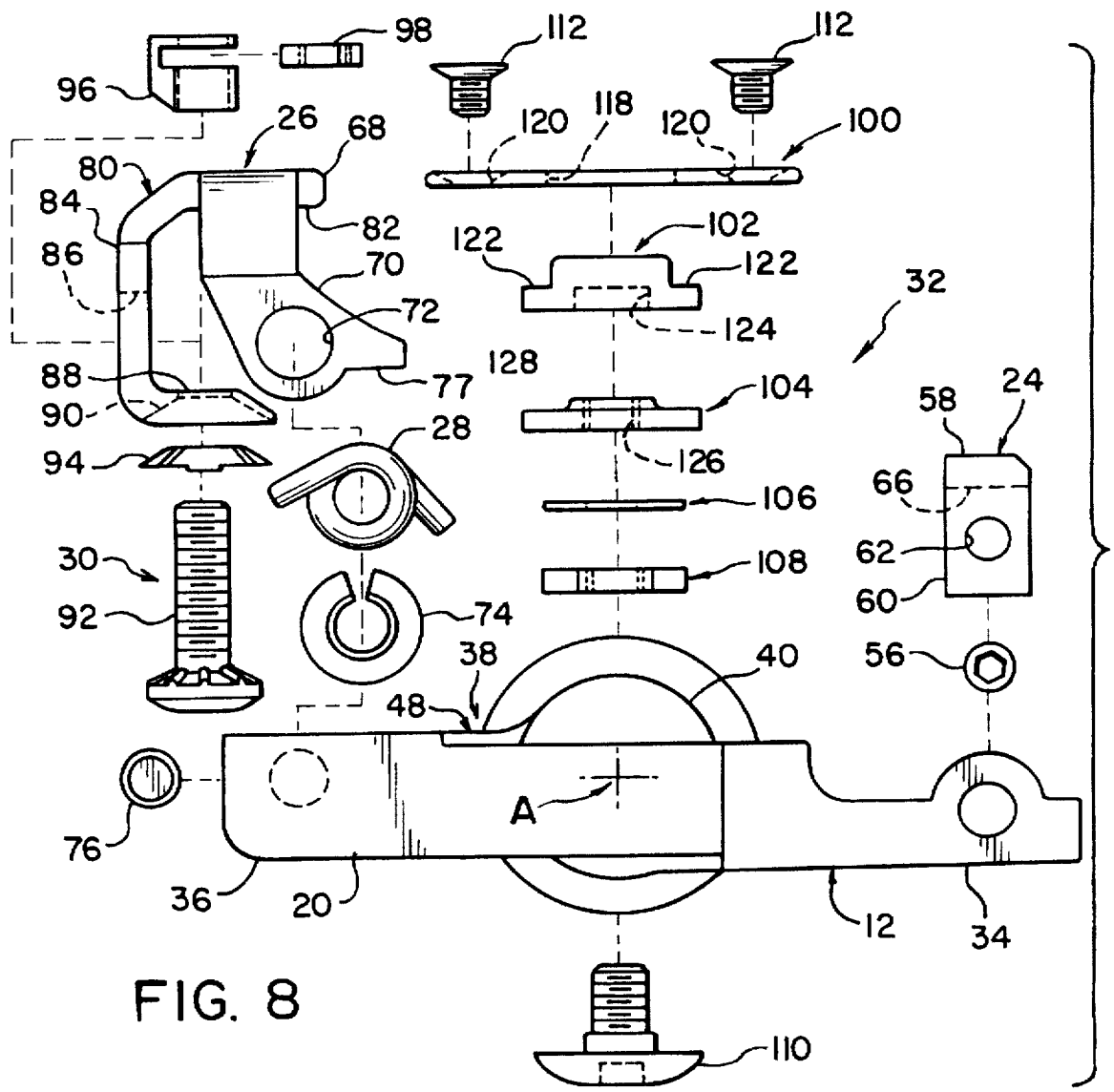
FIG. 8 is an exploded elevational view of the low profile bicycle pedal illustrated in FIGS. 1-7.
Figure 9:
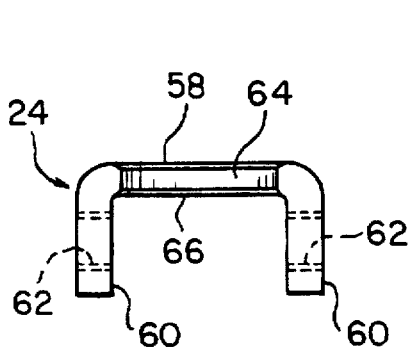
FIG. 9 is a left end elevational view of the front clamping member for the low profile bicycle pedal illustrated in FIGS. 1-8.
Figure 10:
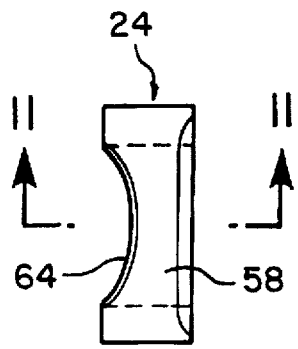
FIG. 10 is a top plan view of the from clamping member illustrated in FIG. 9 for the low profile bicycle pedal illustrated in FIGS. 1-8.
Figure 11:
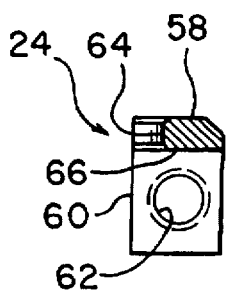
FIG. 11 is a cross-sectional view of the from clamping member illustrated in FIGS. 9 and 10 taken along section line 11—11 of FIG. 10.

Referring to FIGS. 5, 6 and 8, tension adjusting mechanism 30 preferably includes an adjustment bolt 92, an adjusting washer 94, an adjusting sleeve 96 and an adjusting nut 98. Adjustment bolt 92 is rotatably received in hole 90 of rear clamping member 26. Washer 94 is located on the shaft of adjustment bolt 92 and is positioned between its head and horizontal portion 88 of rear clamping member 26. Adjusting washer 94 is provided with ribs which engage ribs formed on the head of adjustment bolt 92 for providing an incremental adjustment of adjustment bolt 92. Adjusting sleeve 96 is slidably received on the shaft of adjustment bolt 92, and retained thereon by adjusting nut 98 which is threadedly secured on adjustment bolt 92. Adjusting sleeve 98 is designed to engage one end of each of the springs of biasing member 28 for adjusting the spring tension applied to rear clamping member 26 by biasing member 28. Moreover, adjusting nut 98 is nested within adjusting sleeve 96 to prevent adjusting nut 98 from rotating relative to rear clamping member 26. Accordingly, rotation of adjustment bolt 92 causes adjusting sleeve 96 and adjusting nut 98 to move axially along the shaft of adjustment bolt 92. Preferably, clockwise rotation of adjustment bolt 92 causes the spring tension of biasing member 28 on rear clamping member 26 to increase, while counterclockwise rotation of adjustment bolt 92 causes a decrease in the spring tension of biasing member 28 on rear clamping member 26. Preferably, adjusting sleeve 28 is visible through slot 86 in rear clamping member 26 such that it acts as a tension indicator for the user to determine the amount of tension being applied by biasing member 28 on rear clamping member 26. This allows the user to easily adjust a pair of bicycle pedals 12 such that they each have equal spring tension.

Referring again to FIGS. 4, 5, 7 and 8, gap adjustment mechanism 32 includes a cover plate 100, an adjustment pad 102, a bottom plate 104, a washer 106, a nut 108 and an adjusting bolt 110. Gap adjusting mechanism 32 is design to limit or control the amount of play or wobbling of cleat 16 relative to pedal body 20, when coupled to pedal body 20. In particular, during normal operation, cleat 16 is coupled to pedal body 20 via front and rear clamping members 24 and 26 such that a certain amount of play exists between the bottom surface of cleat 18 and cleat supporting surface 48. Gap adjusting mechanism 32 is designed to control or limit the amount of play or wobbling occurring between cleat 16 and pedal body 20. In fact, gap adjusting mechanism 32 can be utilized to eliminate any wobbling if needed or desired. However, many cyclists desire a certain amount of play between their shoe and the bicycle pedal 12. Accordingly, it is desirable to provide some play or movement between cleat 16 and the pedal body 20 during the upward swing of the bicycle pedal 12 during rotation of crank arm 14.

Preferably, gap adjusting mechanism 32 is located adjacent the end of pedal shaft 22 and sleeve 40 such that gap adjusting mechanism 32 intersects with the center longitudinal axis A of pedal shaft 22. Of course, gap adjusting mechanism 32 could be located at other positions on pedal body 20, if needed or desired. While gap adjusting mechanism 32 is illustrated as being vertically adjustable, it will be appreciated by those skilled in the art once given this disclosure that gap adjusting mechanism 32 could be a fixed mechanism wherein the size of pad 102 is interchanged with a different sized pad. In other words, the adjustment of the gap between the cleat 16 and the cleat supporting surface 48 of the pedal body 20 can be adjusted by interchanging different sizes of pads 102. Moreover, even in the illustrated gap adjusting mechanism 32 it will be apparent to those skilled in the art once given this disclosure that pad 102 can be replaced when worn out with a new pad or could be interchanged with different size or shape pads as needed and/or desired.

Figure 4:
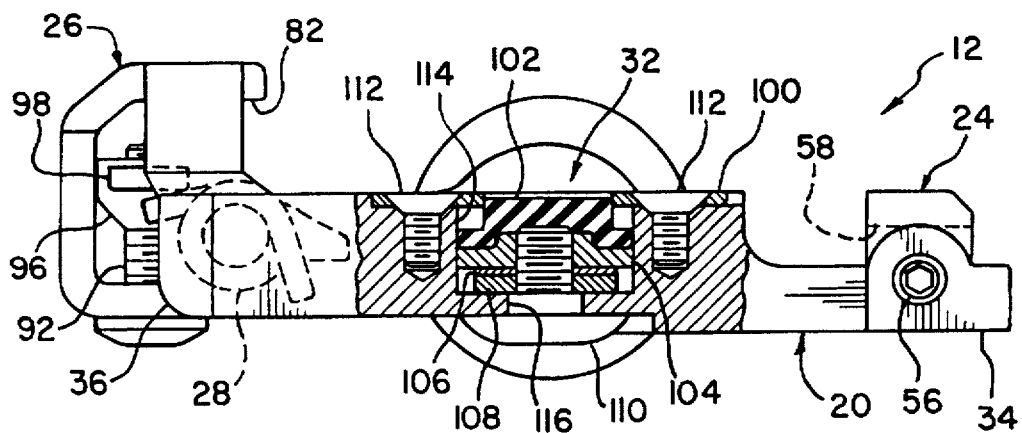
FIG. 4 is an outside elevational view of the low profile bicycle pedal with a section of the pedal body broken away to illustrate the gap adjusting mechanism.

As seen in FIGS. 4 and 5, cover plate 100 is secured to pedal body 20 by a pair of screws 112. Cover plate 100 retains pad 102, bottom plate 104, washer 106 and nut 108 within recess 114 of pedal body 20. A hole 116 is provided at the bottom of recess 114 for receiving the shaft of adjusting bolt 110 therethrough. More specifically, adjusting bolt 110 is rotatably positioned within hole 116 and has pad 102, bottom plate 104, washer 106 and nut 108 coupled thereto for vertical movement within recess 114. This vertical movement is accomplished by rotating adjusting bolt 110 which in turn causes adjusting plate 104 and nut 108 to move along its axis since they are threadedly secured to adjusting bolt 110. Also, bottom plate 104 and nut 108 are sized and shaped relative to recess 114 so that they do not rotate within recess 114 when adjusting bolt 110 is rotated.

Cover plate 100 is preferably a thin metal plate having a center rectangular opening 118 and a pair of circular holes 120. The top surface of cover plate 100 forms part of cleat supporting surface 48. Opening 118 is sized to receive the upper portion of pad 102 therethrough, while holes 120 are sized to receive screws 112 therethrough for fixedly securing cover plate 100 to pedal body 20 over recess 114. Of course, opening 118 is smaller than recess 114 and pad 102 such that pad 102 is retained within recess 114.

Referring now to FIGS. 20–22, pad 102 is illustrated as a substantially rectangular member with a pair of outwardly extending end flanges 122 and a centrally located blind bore 124 in its lower surface. Flanges 122 are designed to engage the bottom of cover plate 100 to prevent pad 102 from falling out of recess 114. Blind bore 124, on the other hand, is designed to frictionally engage bottom plate 104 for securing bottom plate 104 thereto via a friction fit. Pad 102 is preferably constructed of either an elastomeric material or a hard plastic material which will not damage cleat 16.

Turning now to FIGS. 23 and 24, bottom plate 104 is substantially a rectangular plate having a centrally threaded bore 126 for threadedly receiving adjusting bolt 110 therethrough. Preferably, bottom plate 104 is constructed of sheet metal and is stamped to form an upwardly extending annular flange 128 surrounding bore 126. Flange 128 is designed to be received within blind hole 124 of pad 102 so as to retain pad 102 to bottom plate 104 via a friction fit as mentioned above. Bottom plate 104 is also sized so that it will not rotate with recess 114 during rotation of adjusting bolt 110.

Referring again to FIG. 8, washer 106 and nut 108 are conventional and sized to be received on adjusting bolt 110. Thus, washer 106 and nut 108 will not be discussed or illustrated in detail herein.

Figure 25:
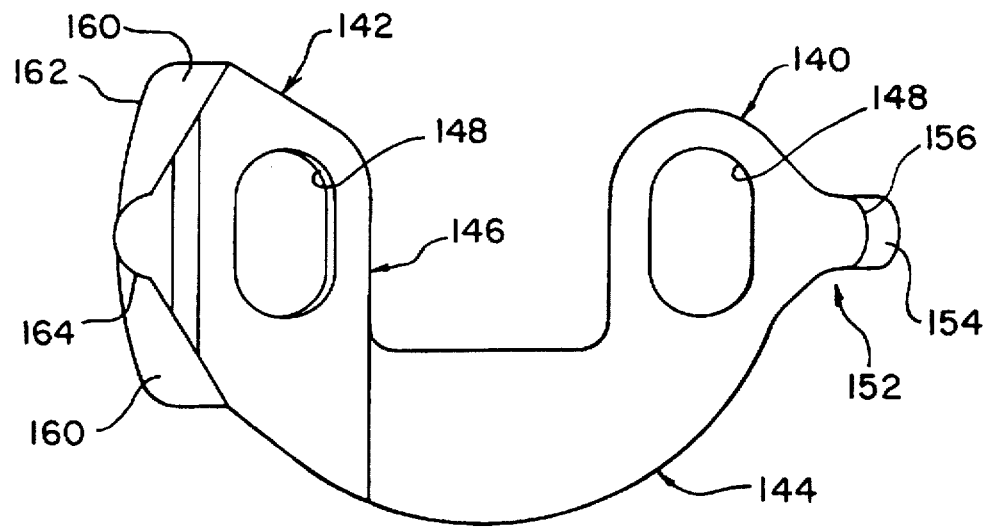
FIG. 25 is a top plan view of the cleat which is utilized in connection with the low profile bicycle pedal illustrated in FIGS. 1-8 as well as the subsequent embodiment of the present invention illustrated in FIGS. 28-32.
Figure 26:
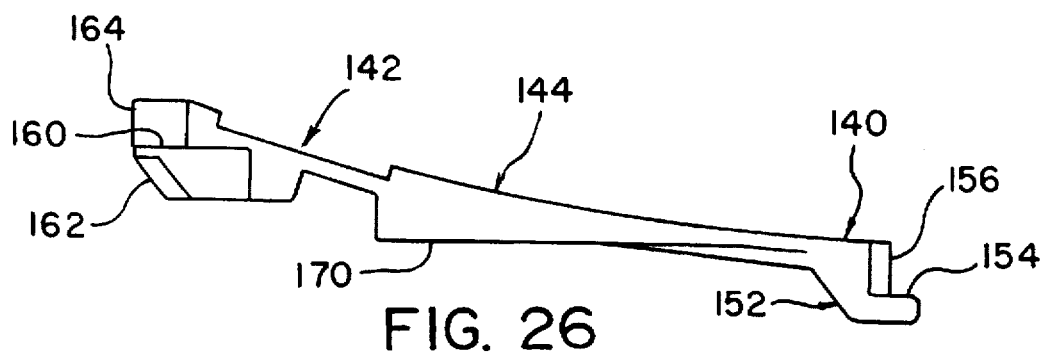
FIG. 26 is a side elevational view of the cleat illustrated in FIG. 25 for use with the low profile bicycle pedals illustrated in FIGS. 1-8 and FIGS. 28-32.
Figure 27:
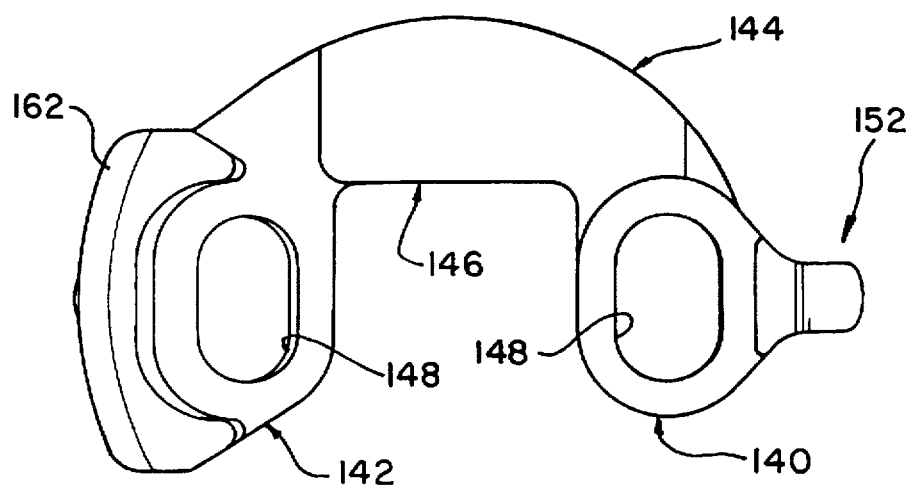
FIG. 27 is a bottom plan view of the cleat illustrated in FIGS. 25 and 26 for use with the low profile bicycle pedals illustrated in FIGS. 1-8 and FIGS. 28-32.
Figure 28:
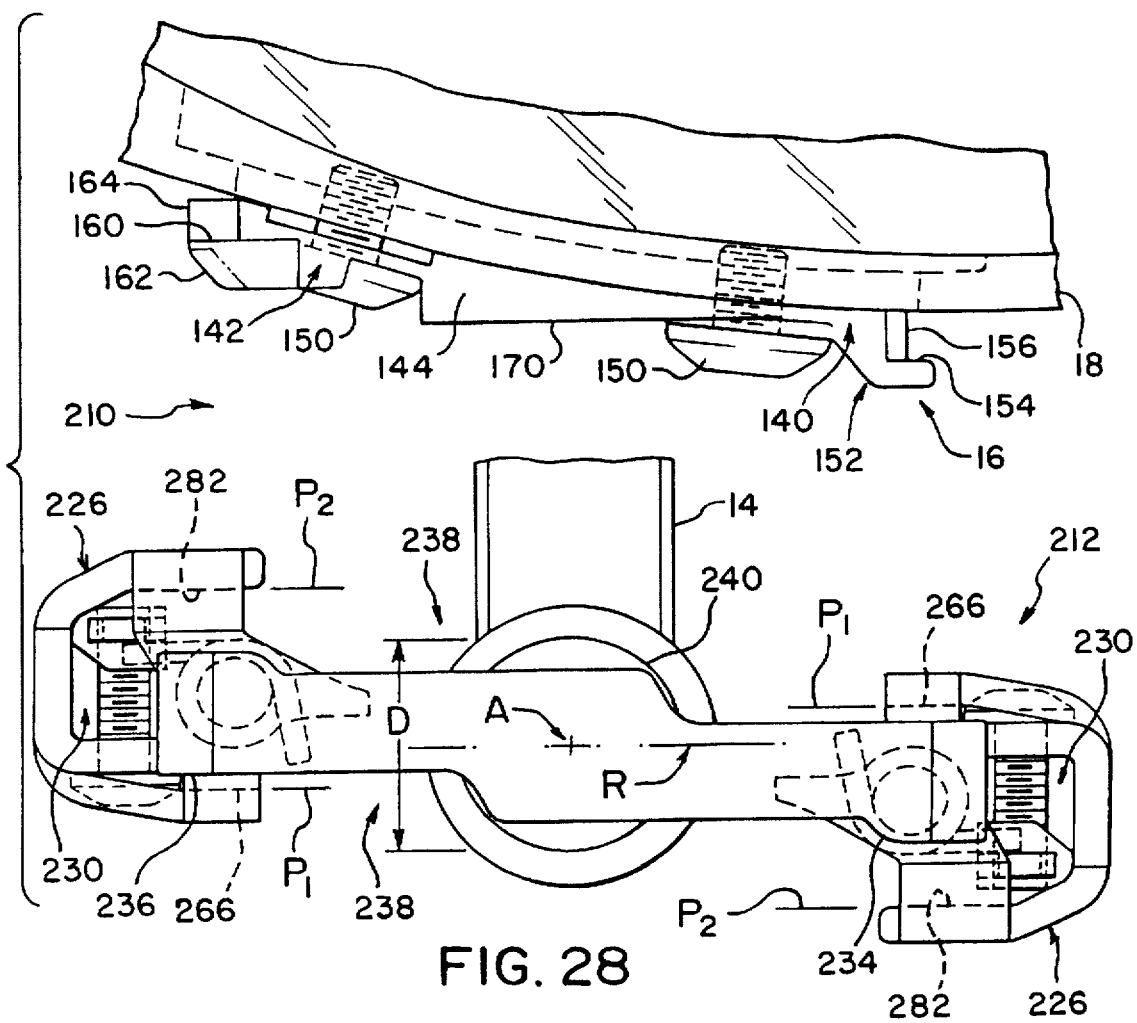
FIGS. 28 is an exploded, outside elevational view of a low profile bicycle pedal in accordance with a second embodiment of the present invention, especially designed for mountain bikes.
Figure 29:
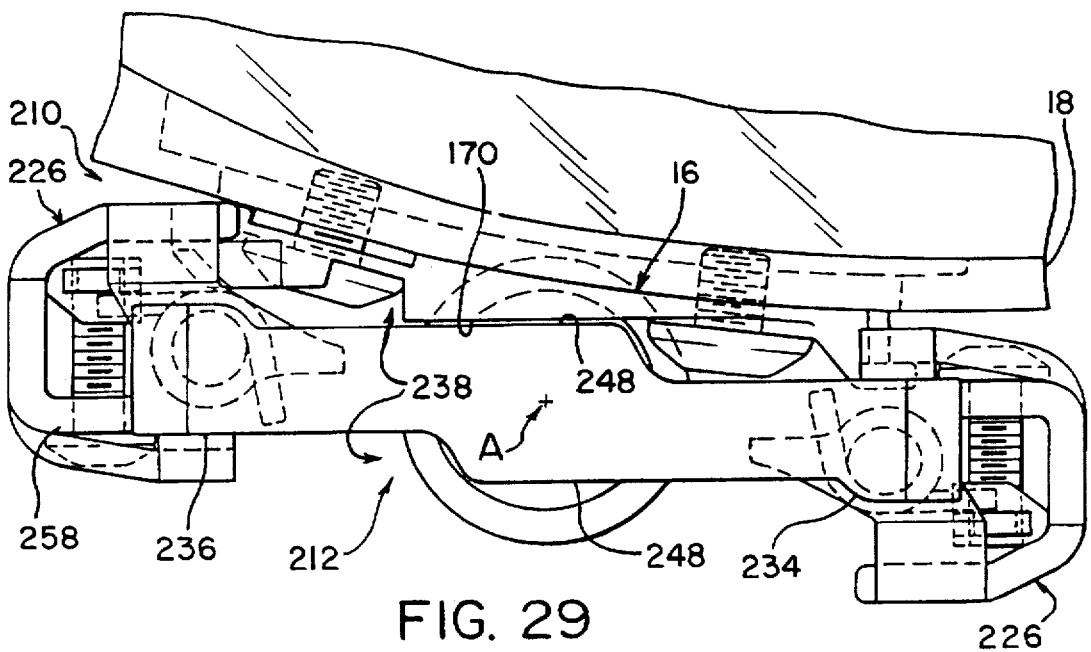
FIG. 29 is an outside elevational view of the low profile bicycle pedal and cleat assembly illustrated in FIG. 28, with the cleat clipped into the low profile bicycle pedal.

Referring now to FIGS. 25–27, cleat 16 has a front attachment portion 140 for engaging from clamping member 24, a rear attachment portion 142 for engaging and moving rear damping member 26, and a connecting portion 144 extending between front attachment portion 140 and rear attachment portion 142. Preferably, front and rear attachment portions 140 and 142 and connecting portion 144 are integrally formed together as a one-piece, unitary member, which is constructed from a suitable rigid material. Cleat 16 is preferably C-shaped with a pedal shaft receiving notch 146 formed by portions 140, 142 and 144. Notch 146 is sized to receive the upper portion of sleeve 40 of pedal body 20 such that cleat 16 can be mounted close to the center longitudinal axis A of pedal shaft 22.

Figure 2:
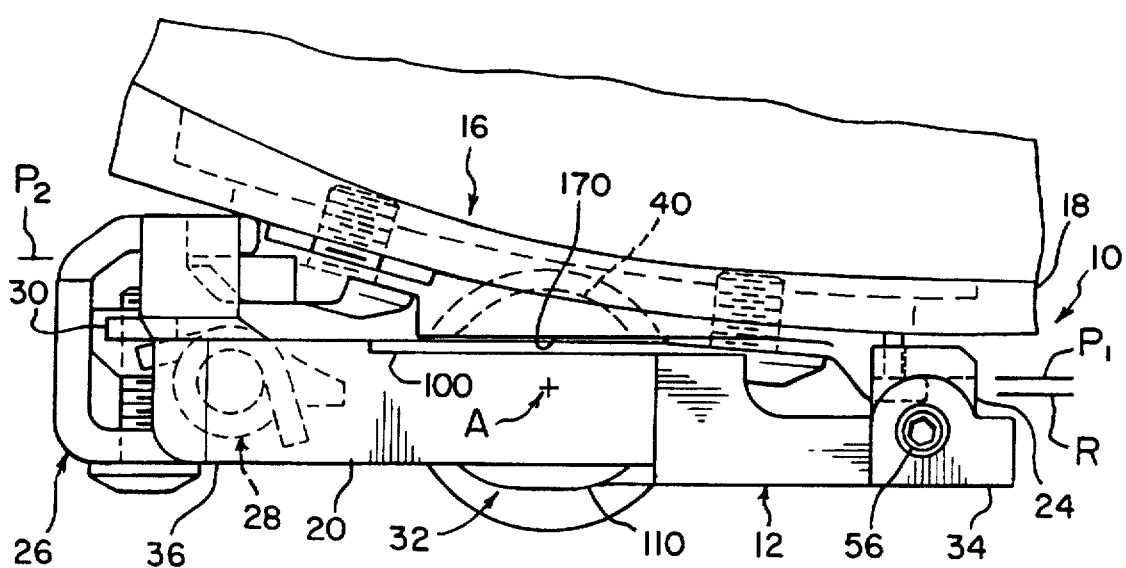
FIG. 2 is an outside elevational view of the low profile bicycle pedal and cleat assembly illustrated in FIG. 1 after the cleat has been clipped into the bicycle pedal.

Front attachment portion 140 and rear attachment portion 144 each has a hole or slot 148 for receiving a fastener 150 as seen in FIGS. 1 and 2 for coupling cleat 16 to sole 18 of the cyclist's shoe in a relatively conventional manner. The interconnection of cleat 16 to sole 18 is relatively well-known in the art, and thus, this interconnection will not be discussed or illustrated in detail herein.

Front attachment portion 140 has a nose portion 152 for engaging front clamping member 24. Nose portion 152 has a front coupling surface 154 and a curved stop surface 156 formed thereon. Front coupling surface 154 is preferably a substantially flat planar surface which is designed to engage front cleat engaging surface 66 of front clamping member 24, discussed above. Curved stop surface 156 is designed to engage cutout portion 64 of front clamping member 24 to prevent forward movement of cleat 16 relative to pedal body 20. Curved stop 156 together with cutout portion 64 act as a pivot point for releasing cleat 16 from pedal body 20.

Rear attachment portion 142 has a pair of rear coupling surfaces 160 for engaging rear cleat engaging surface 82 of rear clamping member 26 to secure cleat 16 to pedal body 20 via rear damping member 26. Rear coupling surfaces 160 are preferably substantially flat planar surfaces which are substantially parallel to front coupling surface 154 of cleat 16. Rear attachment portion 142 also has a curved or angled cam surface 162 which is designed to engage cutout portion 78 of rear clamping member 26 during coupling of cleat 16 to pedal body 20. In particular, cam surface 162 is designed to rotate rear damping member 26 rearwardly from its normal cleat engaging position to its cleat releasing position during the downward movement of cleat 16 relative to pedal body 20. Rear attachment portion 142 also includes a curved stop surface 164 for engaging cutout 78 to prevent rearward movement of cleat 16 relative to pedal body 20 when coupled thereto.

Connecting portion 144 has a planar bottom surface 170 which is designed to engage cleat supporting surface 48 and/or pad 102 depending upon the positioning of pad 102. While only bottom surface 170 engages cleat supporting surface 48 of pedal body 20, it will be apparent to those skilled in the art once given this disclosure that other portions of cleat 16 can be designed to engage cleat supporting surface 48 of pedal body 20.

In coupling cleat 16 to bicycle pedal 12, the rider steps onto pedal body 20 which in turn causes clamping members 24 and 26 to automatically grip on to cleat 16 secured to the bottom of the cyclist's shoe. Tension adjusting mechanism 30 can be adjusted to vary the force required to release the shoe cleat 16 from the step-in pedal 12.

More specifically, when attaching the cyclist's shoe to the step-in pedal 12 through cleat 16, the cyclist moves the shoe obliquely downwardly and forwardly relative to pedal body 20 such that the from end or nose portion 152 of cleat 16 engages front clamping member 24 of pedal body 20. Once the front end of cleat 16 is engaged with front clamping member 24 of pedal body 20, the cyclist places the rear end of cleat 16 in contact with rear clamping member 26 of pedal body 20. This causes cam surface 162 to engage cutout portion 78 of rear clamping member 26. In this position, the cyclist presses the shoe downwardly against pedal 12 to cause rear clamping member 26 to initially pivot rearwardly against the force of biasing member 28 to pivot rear clamping member 26 to a cleat releasing position. The rear end of cleat 16 then enters a position opposite a back face of the rear clamping member 26. Then, rear clamping member 26 returns under the force of a biasing member 28 so that rear damping member 26 engages the rear end of cleat 16. This engagement fixes the cyclist's shoe to pedal 12 via cleat 16.

When releasing the shoe from pedal 12, the cyclist will typically turn the shoe about an axis perpendicular or approximately perpendicular to axis B of pedal 12, using the front end or nose portion 152 of cleat 16 as a pivoting point. As a result of this pivoting action, rear damping member 26 is pivoted rearwardly against the force of the springs to a cleat releasing position to release the shoe from pedal 12.

Second Embodiment

Referring now to FIGS. 28–37, a bicycle pedal and cleat assembly 210 in accordance with a second embodiment of the present invention is illustrated. Bicycle pedal and cleat assembly 210 includes a bicycle pedal 212 and cleat 16 which was previously discussed above. Bicycle pedal 212 is similar to bicycle pedal 12 discussed above, and thus, certain features of bicycle pedal 212 will not be disclosed or discussed in detail herein.

The bicycle pedal 212 illustrated in the drawings is a right side pedal. Of course, the same pedal is provided on the left side of the bicycle with the left side pedal being the mirror image of the right side pedal 212. Thus, the description will be made herein with reference to only one of the pedals. Cleat 16 is designed to releasably couple sole 18 of the shoe to bicycle pedal 212. This type of pedal is often called a step-in pedal. Specifically, cleat 16 is engaged with pedal 212 by pressing cleat 16 into pedal 212 with a forward and downward motion. This releasably locks cleat 16 to pedal 212. Cleat 16 can be released from pedal 212 by twisting the heel of the shoe to the outside of pedal 212 as discussed below in more detail.

Bicycle pedal 212 includes a pedal body 220 for supporting a cyclist's foot, a pedal shaft 222 rotatably coupled to pedal body 220, a pair of substantially identical clamping members 226 pivotally coupled to pedal body 220, a pair of biasing members 228 coupled between pedal body 220 and clamping members 226, and a pair of tension adjusting mechanisms 230 coupled to damping members 226. Bicycle pedal 212 is especially designed for use with mountain bikes as opposed to use with road bikes. In particular, both sides of bicycle pedal 212 can be attached to cleat 16 as discussed below.

Figure 30:
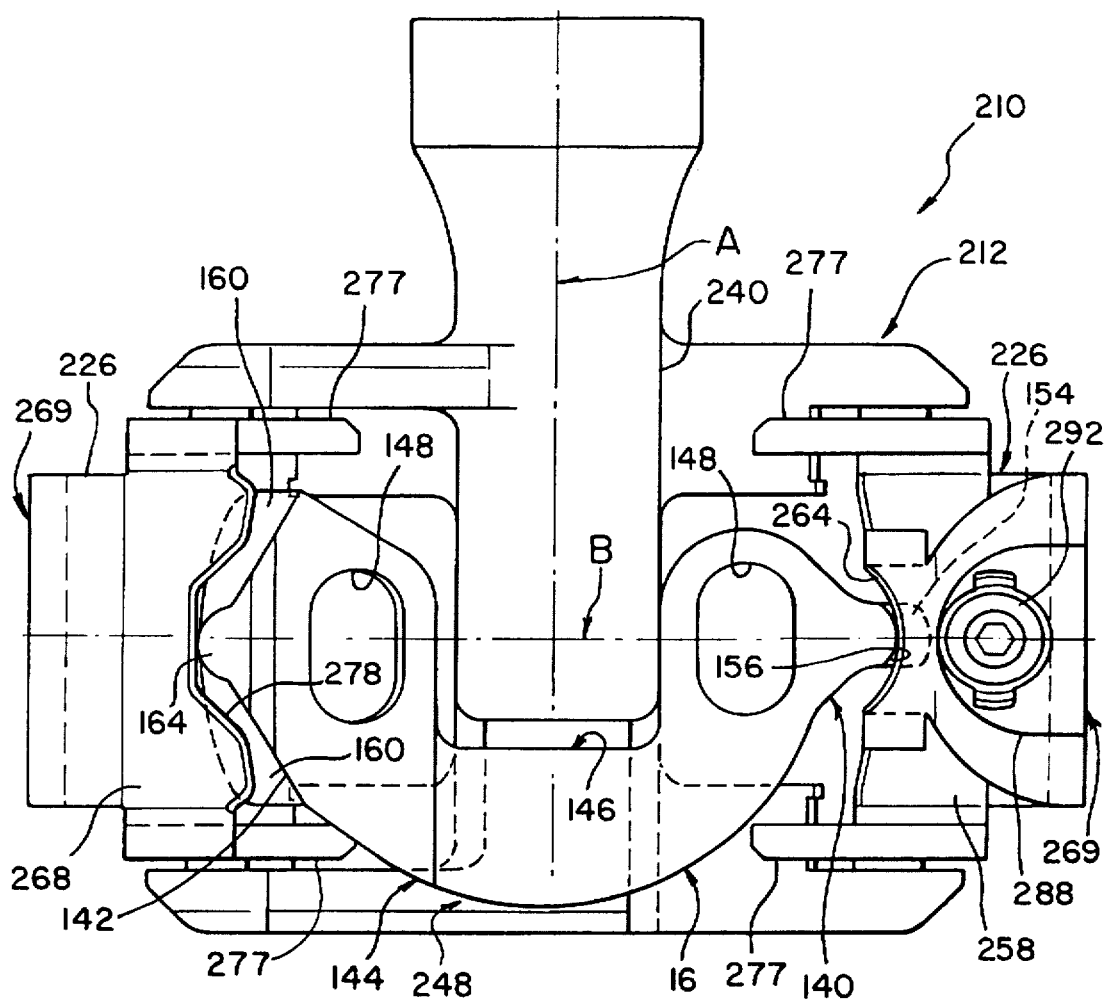
FIG. 30 is a top plan view of the low profile bicycle pedal and cleat assembly illustrated in FIG. 29, with the shoe removed from the cleat for purposes of illustration.
Figure 31:
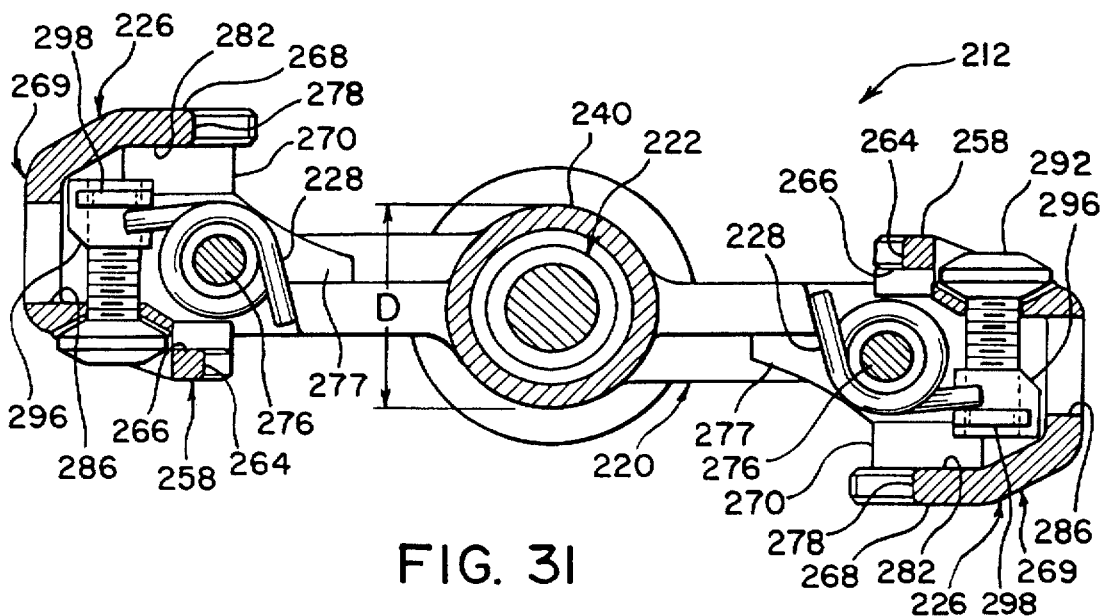
FIG. 31 is a longitudinal cross-section of the low profile bicycle pedal illustrated in FIGS. 28-30.
Figure 32:
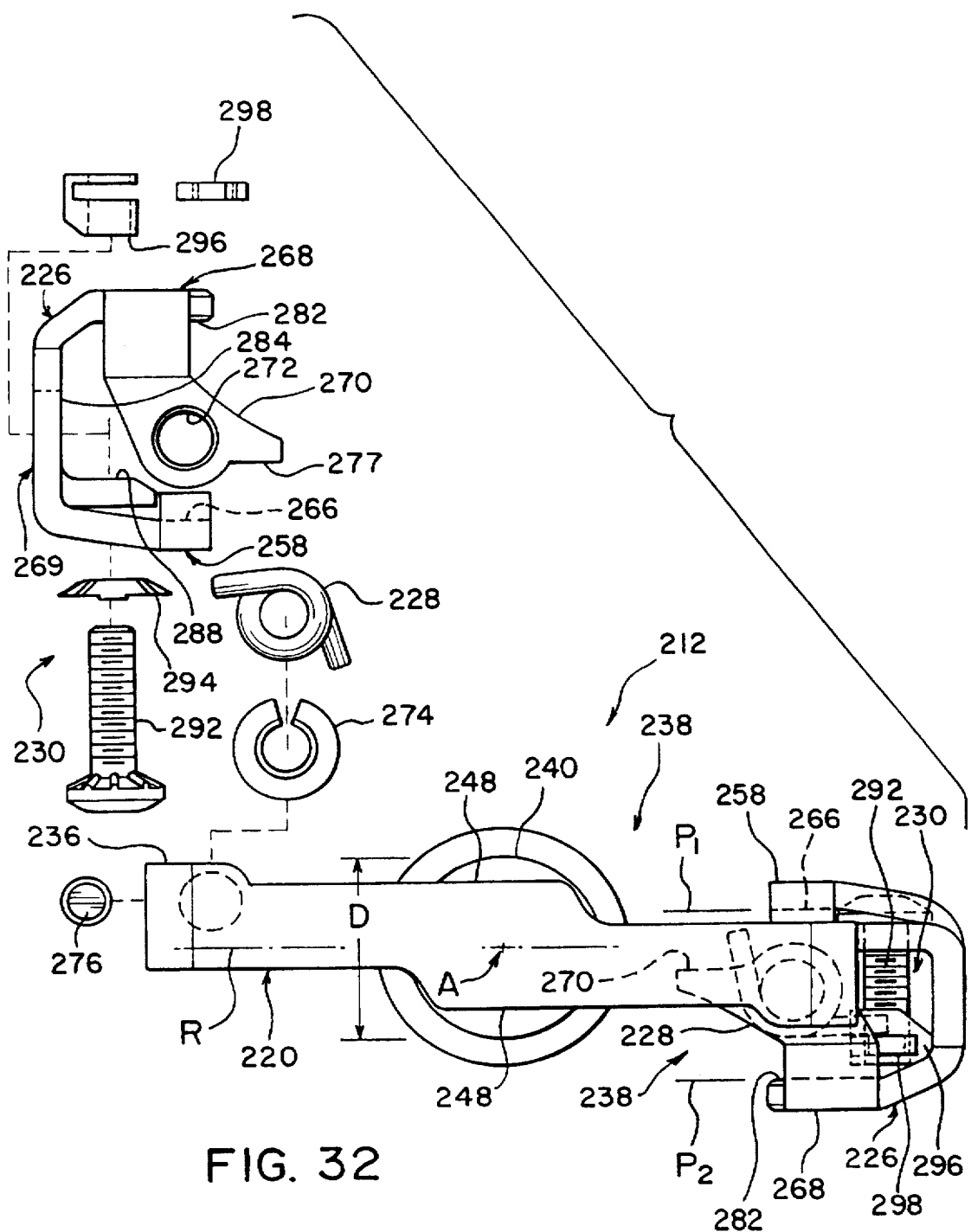
FIG. 32 is a partially exploded elevational view of the low profile bicycle pedal illustrated in FIGS. 28-31.
Figure 33:
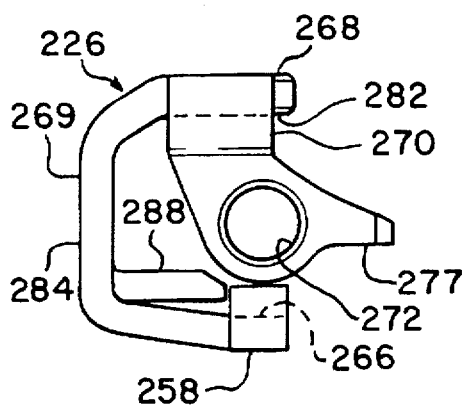
FIG. 33 is a side elevational view of one of the clamping members for the low profile bicycle pedal illustrated in FIGS. 28-32.
Figure 34:
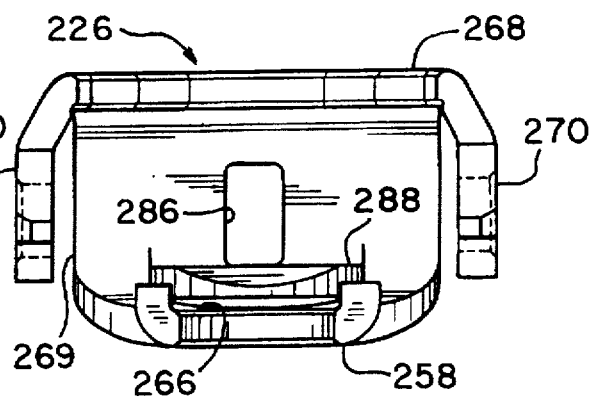
FIG. 34 is a right end elevational view of the damping member illustrated in FIG. 33 for the low profile bicycle pedal illustrated in FIGS. 28-32.
Figure 35:
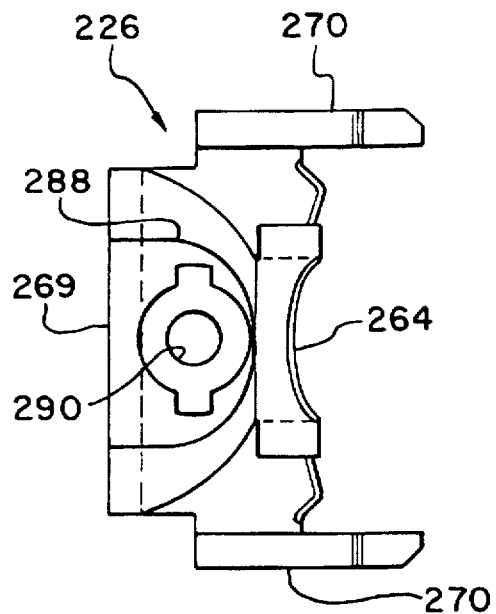
FIG. 35 is a bottom plan view of the clamping member illustrated in FIGS. 33 and 34 for the low profile bicycle pedal illustrated in FIGS. 28-32.
Figure 36:
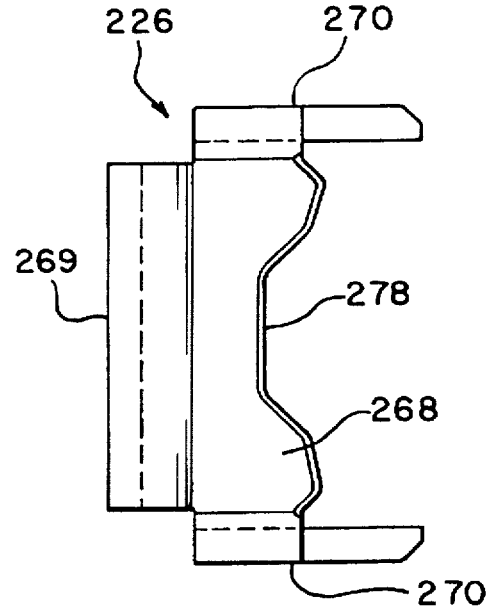
FIG. 36 is a top plan view of the clamping member illustrated in FIGS. 33-35 for the low profile bicycle pedal illustrated in FIGS. 28-32.
Figure 37:
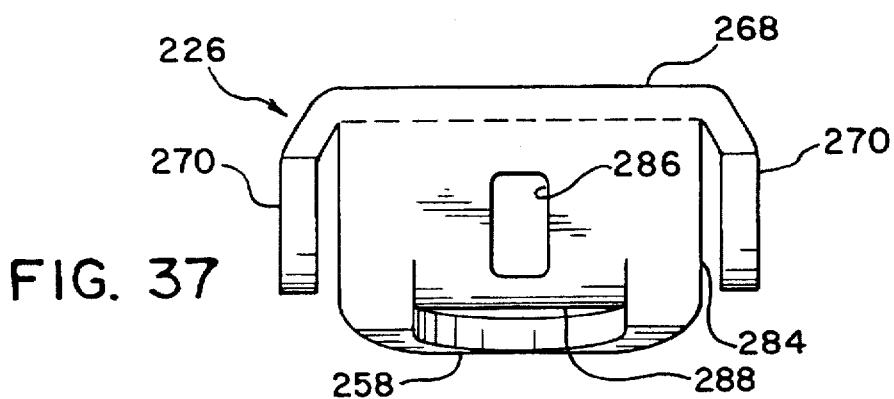
FIG. 37 is a left end elevational view of the clamping member illustrated in FIGS. 33-36 for the low profile bicycle pedal illustrated in FIGS. 28-32.

As seen in FIG. 31, pedal body 220 is rotatably coupled to pedal shaft 222 for rotation about a center longitudinal axis A of pedal shaft 222. Pedal body 220 has a first end 234 with one of the clamping members 226 pivotally coupled thereto, and a second end 236 with the other clamping member 226 pivotally coupled thereto. As seen in FIG. 30, pedal body 220 has a center longitudinal axis B extending between first end 234 and second end 236. Center longitudinal axis B of pedal body 220 extends substantially perpendicular to center longitudinal axis A of pedal shaft 222. A reference plane R is defined by a flat horizontal plane passing through both center longitudinal axis A and B. Reference plane R will be used throughout the description of this invention and in the claims to define the structural relationships of various parts.

A cleat receiving area 238 is formed on each side of pedal body 220 for releasably receiving and supporting cleat 16 thereon. More specifically, cleat receiving areas 238 are defined between clamping members 226.

Pedal body 220 further includes a sleeve 240 with a substantially cylindrical bore 240 for rotatably receiving pedal shaft 222 therein. Pedal shaft 222 is preferably substantially identical to pedal shaft 22, discussed above. Sleeve 240 together with pedal shaft 222 define an effective outer diameter of rotation D between pedal body 220 and pedal shaft 222. The effective outer diameter of rotation D for the purposes of this claimed invention refers to the axial structure of pedal body 220 and pedal shaft 222 necessary for rotation between pedal body 220 and pedal shaft 222. In other words, the effective outer diameter of rotation D should not be limited to the preferred embodiment illustrated in the drawings.

Each of the cleat receiving areas 238 has a cleat supporting surface 248 located between clamping members 226 with at least a portion of cleat supporting surface 48 being positioned at the end of sleeve 240 and substantially along a vertical plane passing through central longitudinal axis A. Each cleat supporting surface 248 lies within the outer effective diameter of rotation D. Since each cleat supporting surface 248 lies within the outer effective diameter of rotation D of sleeve 240 of pedal body 220 and pedal shaft 222, cleat 16 can be positioned very close to the center longitudinal axis A of pedal shaft 222. This arrangement is desirable since the force of the cyclist's foot is moved close to the center longitudinal axis A of pedal shaft 222.

As seen in FIGS. 28-31, clamping members 226 are each substantially U-shaped and pivotally coupled to pedal body 220 via a threaded pin 276. Threaded pin 276 is threadedly coupled to pedal body 220 in a substantially conventional manner, and thus, will not be discussed in further detail. Clamping members 226 are each preferably an integral member constructed of a one-piece unitary member from a suitable material such as a rigid metallic material. Since clamping members 226 are identical, only one of the clamping members 226 will be discussed herein and identical reference numbers will be used to identify like parts.

Each of the clamping members 226 has a front cleat engaging portion 258 for engaging nose portion 152 of cleat 16, a rear cleat engaging portion 268 for engaging rear cleat coupling surfaces 160, a middle or intermediate portion 269 interconnecting front and rear cleat engaging portions 258 and 268 together, and a pair of legs 270 extending downwardly from rear cleat engaging portion 268 for coupling clamping member 226 to pedal body 220. More specifically, each of the legs 270 of each clamping member 226 has a mounting hole 272 formed therein for receiving a bushing 274 to rotatably mount clamping member 226 on pivot pin 276. Accordingly, each clamping member 226 is pivotally mounted about pivot pin 276 for movement between a cleat clamping position and a cleat releasing position. Each of the legs 270 also has a stop portion 277 which engages pedal body 220 to limit rotational movement of its clamping member 226 via biasing member 228.

Front cleat engaging portion 258 of each damping member 226 has a curved cutout portion 264 for engaging stop surface 156 of cleat 16. Front cleat engaging portion 258 also has a front cleat engaging surface 266 which faces downwardly towards the adjacent side of pedal body 220 for engaging front cleat coupling surface 154. Front cleat engaging surface 266 preferably lies in a plane $P_1$ which lies substantially parallel to reference plane R. Preferably, plane $P_1$ is spaced slightly above reference plane R. Of course, it will be apparent to those skilled in the art that plane $P_1$ can be moved closer or farther from reference plane K as needed and/or desired.

Rear cleat engaging portion 268 of each clamping member 226 has a contoured cutout portion 278 along its front surface which faces towards front cleat engaging portion 258 of the other clamping member for engaging stop surface 164 of cleat 16. A rear cleat engaging surface 282 is formed on the bottom surface of rear cleat engaging portion 268 for engaging and retaining rear cleat coupling surfaces 160 of cleat 16 to pedal body 220. Rear cleat engaging surface 282 is preferably a substantially flat surface which lies in a plane $P_2$ which is substantially parallel to reference plane R as well as plane $P_1$ of front cleat engaging portion 258. Preferably, plane $P_2$ is spaced farther than plane $P_1$ from reference plane R. Of course, it will be apparent to those skilled in the art that it is possible to have planes $P_1$ and $P_2$ coincide with each other if needed or desired.

Middle or intermediate portion 269 of each clamping member 226 has a vertical portion 284 with a slot 286 and a substantially horizontal portion 288 with a hole 290. Slot 286 is designed for viewing the position of tension adjusting mechanism 230 which is coupled within hole 290 of mounting flange 280 for movement therewith, as explained below.

Biasing member 228 is preferably a pair of torsion springs which are mounted on pivot pin 256 with one end of each spring engaging a part of pedal body 220 and the second end of each spring engaging a part of tension adjusting mechanism 230. Each biasing member 228 normally urges its clamping member 226 to rotate about pivot pin 276 from a cleat releasing position to a cleat clamping position. In other words, each biasing member 228 normally maintains its clamping member 226 in a cleat engaging position such that plane $P_2$ of rear cleat engaging surface 282 is substantially parallel to reference plane R. The retaining force of each biasing member 228 on its clamping member 226 is controlled by its associated tension adjusting mechanism 230.

Each of the tension adjusting mechanisms 230 preferably includes an adjustment bolt 292, an adjusting washer 294, an adjusting sleeve 296 and an adjusting nut 298. Adjustment bolt 292 is rotatably received in hole 290 of clamping member 226. Washer 294 is located on the shaft of adjustment bolt 292 and is positioned between its head and horizontal portion 288 of its clamping member 226. Adjusting washer 294 is provided with ribs which engage ribs formed on the head of adjustment screw 292 for providing an incremental adjustment of adjustment bolt 292. Adjusting sleeve 296 is slidably received on the shaft of adjustment bolt 292, and retained thereon by adjusting nut 298 which is threadedly secured on adjustment bolt 292. Adjusting sleeve 298 is designed to engage one end of each of the biasing members 228 for adjusting the spring tension applied to its clamping member 226 by its biasing member 228. Moreover, adjusting nut 298 is nested within adjusting sleeve 296 to prevent adjusting nut 298 from rotating relative to its clamping member 226. Accordingly, rotation of adjustment bolt 292 causes adjusting sleeve 296 and adjusting nut 298 to move axially along the shaft of adjustment bolt 292. Preferably, clockwise rotation of adjustment bolt 292 causes the spring tension of biasing member 228 on its clamping member 226 to increase, while counterclockwise rotation of adjustment bolt 292 causes a decrease in the spring tension of biasing member 228 on its clamping member 226. Preferably, adjusting sleeve 296 is visible through slot 286 in its clamping member 226 such that it acts as a tension indicator for the user to determine the amount of tension being applied by biasing member 228 on its clamping member 226. This allows the user to easily adjust a pair of bicycle pedals 12 such that they each have equal spring tension.

In coupling cleat 16 to bicycle pedal 212, the rider steps onto body 220 which in turn causes the clamping members 226 to automatically grip on to cleat 16 secured to the bottom of the cyclist's shoe. Tension mechanism 230 can be adjusted to vary the force required to release cleat 16 from the step-in pedal 212.

More specifically, when attaching the cyclist's shoe to step-in pedal 212 through cleat 16, the cyclist moves the shoe obliquely downwardly and forwardly relative to pedal body 220 such that the front or nose portion 152 end of the cleat 16 engages one of the from cleat engaging surfaces 258 of pedal body 220. Once the front end of cleat 16 is engaged with one of the front cleat engaging surfaces of pedal body 220, the cyclist places the rear end of cleat 16 in contact with one of the rear cleat engaging surfaces 282 of the pedal body 220. In this position, the cyclist presses the shoe downwardly against the pedal body 220 to cause the rear clamping member 226 to initially pivot rearwardly against the force of its biasing member 228 to move the rear clamping member 226 to a cleat releasing position. The rear end of cleat 16 then enters a position opposite a back face of the rear clamping member 226. Then, the rear clamping member 226 returns under the force of its biasing member 228 or spring so that the rear clamping member 226 engages the rear end of cleat 16. This engagement fixes the cyclist's shoe to the pedal 212 via cleat 16.

When releasing the shoe from pedal 212, the cyclist will typically turn the shoe about an axis perpendicular or approximately perpendicular to axis B of pedal 212, using the front end or nose portion 152 of cleat 16 as a pivoting point. As a result of this pivoting action, the rear clamping member 226 is pivoted rearwardly against the force of the springs to a cleat releasing position to release the shoe from pedal 12.

While only two embodiments have been chosen to illustrate the invention, it will be understood by those skilled in the art that various changes and modifications can be made therein without departing from the scope of the invention as defined in the appending claims.

What is claimed is:

1. A bicycle pedal assembly for coupling a shoe thereto, said bicycle pedal assembly comprising:

a pedal shaft having a first end for attachment to a bicycle crank, a second end for supporting a cyclist's foot, and a center longitudinal axis of rotation;

a pedal body rotatably coupled to said second end of said pedal shaft with a portion of said pedal body and said pedal shaft defining an effective outer diameter of rotation therebetween, said pedal body having a first end, a second end, a first side with a first cleat supporting surface facing in a first direction and a second side facing in a second direction, said first cleat supporting surface being configured to form a cleat engaging recessed portion located at least adjacent said second end of said pedal shaft and lying within said effective outer diameter of rotation between said portion of said pedal body and said pedal shaft;

a first clamping member coupled to said first end of said pedal body, and having a front cleat engaging portion with a first cleat engaging surface facing in a direction substantially opposed to said first direction of said first cleat supporting surface; and a second clamping member coupled to said second end of said pedal body, and having a rear cleat engaging portion with a second cleat engaging surface facing in a direction substantially opposed to said first direction of said first cleat supporting surface said pedal shaft extends between said front and rear cleat engaging portions with said effective outer diameter of rotation located between said front and rear cleat engaging portions.

2. A bicycle pedal assembly according to claim 1, wherein said portion of said pedal body includes a sleeve for rotatably receiving said pedal shaft therein.

3. A bicycle pedal assembly according to claim 1, wherein said first cleat engaging surface lies in a first plane and said second cleat engaging surface lies in a second plane substantially parallel to said first plane, but offset therefrom.

4. A bicycle pedal assembly according to claim 3, wherein said first and second planes are substantially parallel to a reference plane passing through said center longitudinal axis of said pedal shaft.

5. A bicycle pedal assembly according to claim 4 wherein, said first plane of said first cleat engaging surface being positioned closer to said reference plane than said second plane of said second cleat engaging surface.

6. A bicycle pedal assembly according to claim 1, wherein said second damping member is pivotally coupled to said pedal body, with a first biasing member positioned between said pedal body and said second clamping member for normally urging said second clamping member from a cleat releasing position to a cleat clamping position.

7. A bicycle pedal assembly according to claim 6, wherein said first biasing member is a torsion spring.

8. A bicycle pedal assembly according to claim 7, wherein a tension adjusting mechanism is coupled to said second damping member for adjusting said torsion spring.

9. A bicycle pedal assembly according to claim 6, wherein said first clamping member is pivotally coupled to said pedal body, with a second biasing member positioned between said pedal body and said first clamping member for normally urging said first clamping member from a cleat releasing position to a cleat clamping position.

10. A bicycle pedal assembly for coupling a shoe thereto comprising a pedal shaft having a first end for attachment to a bicycle crank, a second end for supporting a cyclist's foot, and a center longitudinal axis of rotation;

a pedal body rotatably coupled to said second end of said pedal shaft with a portion of said pedal body and said pedal shaft defining an effective outer diameter of rotation therebetween, said pedal body having a first end, a second end, a first side with a first cleat supporting surface facing in a first direction and a second side facing in a second direction, said first cleat supporting surface having cleat receiving recess located at least adjacent said second end of said pedal shaft and lying within said effective outer diameter of rotation between said portion of said pedal body and said pedal shaft;

a first clamping member coupled to said first end of said pedal body, and having a front cleat engaging portion with a first cleat engaging surface facing in a direction substantially opposed to said first direction of said first cleat supporting surface;

a second clamping member coupled to said second end of said pedal body, and having a rear cleat engaging portion with a second cleat engaging surface facing in a direction substantially opposed to said first direction of said first cleat supporting surface; and a cleat adapted to be coupled to the shoe, and releasably coupled to said pedal body via said first and second clamping members, said cleat including a front attachment portion adapted to be coupled to the shoe via a first fastener, said front attachment portion having a front coupling surface lying in a third plane and adapted to engage said first clamping member, a rear attachment portion adapted to be coupled to the shoe via a second fastener, said rear attachment portion having a rear coupling surface lying in a fourth plane and adapted to engage said second clamping member, and a connecting portion interconnecting said front and rear attachment portions together, said connecting portion being offset from a center vertical plane of said shoe cleat for forming a pedal shaft receiving notch between said front and rear attachment portions.

11. A bicycle pedal assembly according to claim 10, wherein said front and rear attachment portions and said connecting portions are integrally formed as a one-piece, unitary member.

12. A bicycle pedal assembly according to claim 11, wherein said front coupling surface is at least partially formed by a first flat section lying in a first plane, and said a rear coupling surface is at least partially formed by a second flat section lying in a second plane which is spaced from and substantially parallel to said first plane of said front coupling surface.

13. A bicycle pedal assembly according to claim 12, wherein said connecting portion has a substantially planar bottom surface lying in a third plane positioned between and parallel to said first and second planes.

14. A bicycle shoe cleat for releasably coupling a shoe to a bicycle pedal, said shoe cleat comprising:

a front attachment portion adapted to be coupled to the shoe via a first fastener, said front attachment portion having a front coupling surface lying in a first plane and adapted to engage a first clamping member of the bicycle pedal;

a rear attachment portion adapted to be coupled to the shoe via a second fastener, said rear attachment portion having a rear coupling surface lying in a second plane and adapted to engage a second clamping member of the bicycle pedal; and a connecting portion interconnecting said front and rear attachment portions together, said connecting portion being offset from a center vertical plane of said shoe cleat for forming a pedal shaft receiving notch between said front and rear attachment portions.

15. A bicycle shoe cleat according to claim 14, wherein said front and rear attachment portions and said connecting portions are integrally formed as a one-piece, unitary member, with each of said front and rear attachment portions having a hole for receiving one of the first and second fasteners therethrough.

16. A bicycle shoe cleat according to claim 14, wherein said front coupling surface is at least partially formed by a first flat section lying in a first plane, and said rear coupling surface is at least partially formed by a second flat section lying in a second plane which is spaced from and substantially parallel to said first plane of said front coupling surface.

17. A bicycle shoe cleat according to claim 16, wherein said connecting portion has a substantially planar bottom surface lying in a third plane positioned between and parallel to said first and second planes.

18. A bicycle shoe cleat according to claim 14, wherein said rear attachment portion has an angled cam surface.

* * * * *